Oct. 26, 1965  R. L. JAESCHKE  3,214,618
BEARING SHUNT
Filed June 8, 1961  2 Sheets-Sheet 1
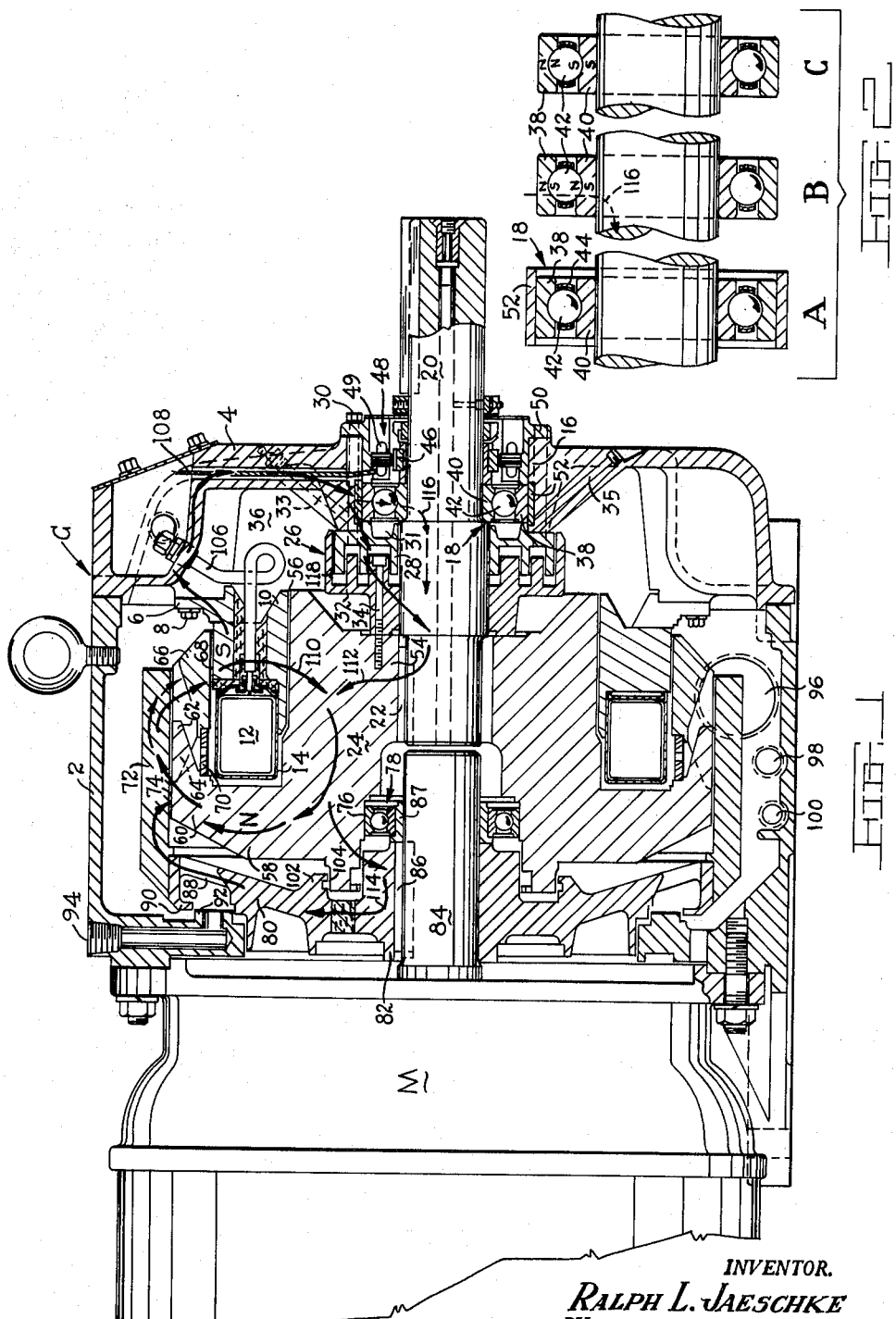
INVENTOR.
RALPH L. JAESCHKE
BY
ATTORNEY

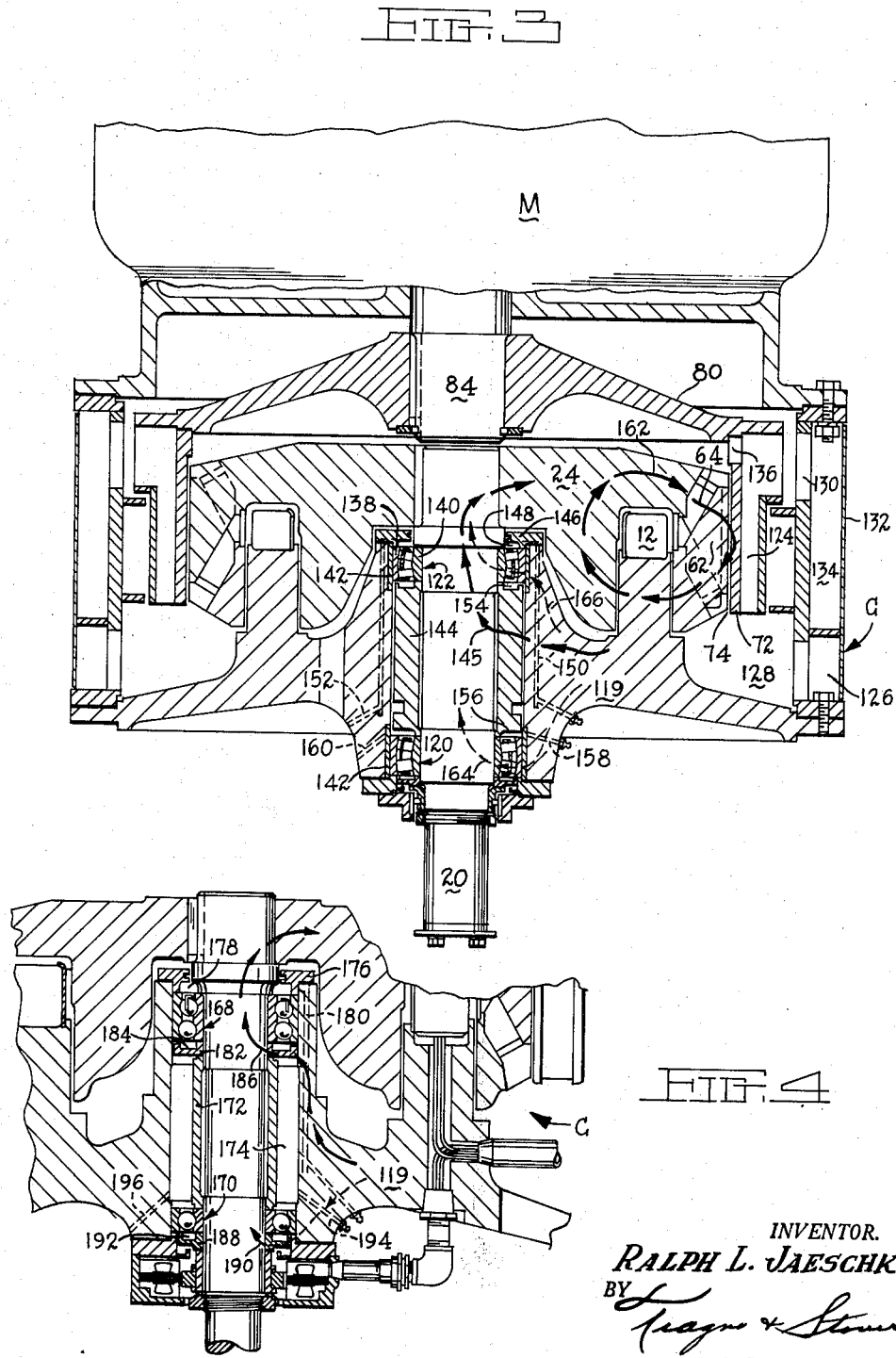

United States Patent Office

3,214,618
Patented Oct. 26, 1965

3,214,618
BEARING SHUNT
Ralph L. Jaeschke, Kenosha, Wis., assignor to Eaton Manufacturing Company, Cleveland, Ohio, a corporation of Ohio
Filed June 8, 1961, Ser. No. 115,716
3 Claims. (Cl. 310—90)

This application relates to dynamoelectric apparatus and concerns particularly arrangements for diverting magnetic flux from hardened steel ball bearings or roller bearings.

An object of the invention is to obviate the heating effect of alternating magnetic flux in low permeability bearing elements such as ball bearings, roller bearings and ball races or roller races which are composed of hardened steel and, therefore, have high hysteresis and eddy current losses.

A further object of the invention is to avoid hysteresis and eddy current effects. A more specific object of the invention is to prevent the expansion or distortion of bearing elements by heating effects of magnetic flux and thus to guard against wear and damage or seizing of low friction bearings such as roller bearings and ball bearings.

Other and further objects, features and advantages of the invention will become apparent as the description proceeds.

In certain types of dynamo electric devices such as induction motors and generators and more particularly eddy current type couplings and brakes, a stray magnetic field is provided by an electrical winding encircling a shaft so as to produce a magnetic field along paths consisting of a plurality of loops each passing axially along the shaft in a direction parallel thereto, then radially outward along one of the supporting members, thence axially along an outer shell or frame of the dynamoelectric device and returning radially inward along the opposite supporting member of the apparatus. Since bearings are required to support the shaft or shafts in the end bells, the bearings are in the paths of the magnetic field loops and are subjected to magnetomotive force causing magnetic flux to oscillate in the bearings. Rotation of the bearing elements also causes rapid reversals of magnetic flux therein with attendant hysteresis effects.

In order to divert the flow of magnetic flux from the bearing elements and to obviate the hysteresis and heating effects thereof, means are provided in accordance with the invention for increasing the reluctance of the magnetic path including the bearings and providing a low reluctance magnetic path or shunt around the bearings. This is accomplished by providing high magnetic reluctance liners or shims between the bearing units and the supporting surfaces of the end bells or shaft and providing relatively high permeability magnetic elements in contact with the shaft adjacent the bearing and the portions of the supporting members surrounding the bearings and non-conducting liners, with short air gaps in the shunt paths so provided so that a relatively low reluctance magnetic path is formed bypassing the bearings.

A better understanding of the invention will be afforded by the following detailed description considered in conjunction with the accompanying drawings in which:

FIG. 1 is a longitudinal section of a liquid-cooled eddy current coupling of the horizontal shaft type embodying the invention;

FIG. 2 is an enlarged view of a type of bearing illustrated in FIG. 1;

FIG. 3 is a longitudinal section of an air-cooled vertical-shaft type eddy current coupling embodying the invention; and FIG. 4 is a fragmentary longitudinal section of a modified form of air-cooled vertical-shaft type eddy current coupling embodying the invention.

Like reference characters are utilized throughout the drawings to designate like parts.

In the embodiment of the apparatus illustrated in FIG. 1 there is a liquid-cooled eddy current coupling shown generally as C with a driving means such as a motor M integrally coupled thereto. The coupling comprises a housing 2 and attached thereto at one end is an end bell 4. An annular supporting ring 6 is attached by means of bolts 8 to the end bell. The supporting ring 6 is part of an annular magnetizable coil support sleeve 10 which carries an annularly wound exciter coil 12 located within a watertight encasement 14. A portion of the end bell 4 forms a sleeve 16 carrying a bearing 18 for a driven shaft 20 to which is keyed at 22 a magnetizable polar field member 24.

A labyrinth seal 26 having a fixed element 28 is attached to the end bell sleeve 16 by means of bolts 30. A C-shaped section of element 28 is axially disposed from bearing 18 and forms a grease chamber 31, grease being admitted through a passage 33 and discharged through grease outlet 35. Element 28, and particularly its C-shaped section, constitutes a bearing grease cap. The labyrinth seal 26 also comprises a rotatable element 32 coupled by means of bolts 34 to the field member 24. Labyrinth seal 26 may be made of magnetizable material such as cast iron and its inter-leaved fingers and close tolerances are designed to prevent liquid coolant from escaping from a chamber 36 within the housing 2.

Bearing 18 is illustrated as a single roll, anti-friction ball bearing type comprising an outside race 38, an inside race 40, a number of balls 42 and a ball cage 44, the latter element shown detailed in FIG. 2. Also carried by the output shaft 20 is a permanent magnet rotor 46 of an A.-C. generator 48 having a stator 49 carried by a nonmagnetic sleeve 50, such as aluminum, attached to the end bell by means of bolts 30. Surrounding the outer race 38 of bearing 18 is a nonmagnetic ring 52 such as stainless steel which is press fit, or otherwise secured, within a bored section of the end bell sleeve 16.

Field member 24 consists of a hub 54 located within support sleeve 10 and forms therewith an inner magnetic gap 56. A radial portion 58 of field member 24 extends from the hub 54 adjacent coil 12 and supports a pole ring 60. From the pole ring 60 extend spaced magnetizable polar teeth 62 which interdigitate with spaced magnetizable polar teeth 64 extending from a second pole ring 66 which forms a second intermediate magnetic gap 68 with support sleeve 10. A nonmagnetizable (stainless steel for example) ring 70 is welded to and mechanically joins the pole rings 60 and 66 but magnetically separates them. An inductor drum 72 surrounds the spaced, interdigitated polar teeth 62 and 64, the faces of which are cylindrically machined and form an outer magnetic gap 74 with the inductor drum. The field member 24 surrounds the fixed or stationary coil 12 in a generally C-shaped configuration and a portion of the field member 24 is counterbored at 76 and shouldered to receive a pilot bearing 78.

The inductor drum 72 is attached to a conical hub 80 by means of welding and a portion of said hub forms a sleeve 82 which is keyed to a shaft 84 of motor M at 86. Shaft 84 carries a pilot bearing sleeve 87 upon which rests the inner race of pilot bearing 78. At the periphery of the hub 80 are openings 88 and an inwardly directed marginal flange 90 forming a coolant catch and a running seal with an inwardly directed portion 92 of the housing 2. Liquid is introduced at inlet 94 and is carried by centrifugal force through the openings 88 and through the outer magnetic gap 74. An outlet 96 at the bottom of the housing allows the liquid coolant to escape after ejection past the open end of drum 72. Apertures 98 and 100 are provided for locating an immersion bulb and a temperature switch. Co-extensions of hub flanges 102 and polar member portion 104 also form a liquid sealing means to prevent liquid coolant from reaching pilot bearing 78. The leads coupling the respective windings of field coil 12 and generator 48 are shown respectively as 106 and 108.

As is well known in the eddy current coupling art, with the inductor drum 72 rotating at a speed determined by the shaft 84 of motor M, eddy currents are developed in the inner surface of the inductor drum when the field coil 12 is energized. For purposes of this description, it will suffice to state that the generation of the aforementioned eddy currents in the inductor drum is responsible for a reaction between the interdigitated teeth of the polar field member 24 and the drum, resulting in rotation of the polar member and the output shaft 20.

The eddy current coupling per se, has been described in order to illustrate a type of magnetic heating problem occurring in various types of dynamoelectric apparatus due to flux leakage.

The major path of magnetic flux in the polar field member 24 is in the direction of the arrows 110 crossing the main or outer air gap 74 between the interdigitated teeth and the drum and thence across intermediate air gaps 68 and 56, respectively. North and south poles in the flux path are arbitrarily identified as N and S for purposes of illustration.

Although the main flux path is confined to the polar member 24, drum 72 and sleeve 10, the presence of the air gaps contributes to the presence of a substantial amount of flux leakage. This flux leakage tends to follow a path generally in the direction of the arrows 112 and 114. In the first instance flux leakage flows outward from sleeve 10, through annular ring 6, a portion of end bell 4, continues axially inwardly through labyrinth seal 26, a portion of shaft 20, and back generally to the polar member 24. Flux leakage also flows from polar member 24 through a portion of hub sleeve 82 radially outwardly through the conical hub 80, thence to the inductor drum 72 and back to the polar teeth. Without the inclusion of the nonmagnetic ring 52, surrounding the outer race of bearing 18, flux leakage would also penetrate the outer race 38, balls 42 and the inner race 40, as shown by the dashed arrows 116. FIG. 2-A is an enlarged view of bearing 18 which illustrates the provision of the nonmagnetic ring 52 surrounding its outer race.

For maintaining maximum efficiency of driven apparatus and reducing the friction loss in the coupling to a minimum, it will be understood that it is desirable to maintain a minimum of bearing friction. To serve this purpose, anti-friction bearings of the ball or roller type are employed and for maximum efficiency of such bearings, it is necessary to maintain close dimensions with small tolerances. A change in dimension, or distortion of the bearing elements by heating is therefore objectionable.

FIG. 2-B illustrates a ball type bearing without a nonmagnetic surrounding shield and polarities N and S are arbitrarily chosen to clearly describe the cause of bearing distortion. Since the elements of the bearings are made of hardened steel, they become excellent permanent magnets and during a given period of time, for example, the upper portion of the ball 42 is of a polarity opposite to its lower portion. Therefore, because the balls 42 rotate during normal operation, the established north and south polarities periodically alternate their positions. This is shown more clearly in FIG. 2-C during a subsequent period in time wherein the respective bearing races are of the same polarity with respect to adjacent portions of the ball.

In view of the aforementioned conditions, not only are eddy currents developed in the surface of the respective balls which in turn generate heat, but the alternate rotation or turning of the balls in a north-south magnetic field creates a high degree of opposition to rotation. Therefore, internal heating due to hysteresis losses, heat generated in the bearing elements due to eddy currents, and rotational difficulty occasioned as hereinbefore described, are all substantially caused by flux leakage passing through the bearing elements. This raises the ball temperature causing the ball to have a slightly larger dimension and causes the bearing to bind or seize and results in damage or at least reflects upon the efficiency and friction developed in the coupling apparatus.

Without the provision of a labyrinth seal 26 in the liquid-cooled coupling as illustrated, the liquid coolant would not be prevented from entering bearing 18. It has been customary to provide bearing seals of the labyrinth type in which at least one of the cooperating or mating elements is composed of material such as aluminum or bronze to minimize seizure. In accordance with the present invention, labyrinth type bearing seals are also employed; however, both elements of the seal are composed of soft iron, cold rolled steel, or the like which have a relatively high magnetic permeability. Also, means are provided for increasing magnetic reluctance to flux leakage through bearing 18 so as to divert magnetic flux therefrom. Thus, the outer bearing race has a nonmagnetic member interposed between it and the end bell sleeve.

It will be understood, however, that the invention is not limited to the specific arrangement illustrated and does not exclude the presence of a nonmagnetic element between the inner race 40 and the shaft 20.

In order to insure not only that the magnetic flux path through the bearing 18 will be of high reluctance, but also that flux leakage will be by-passed around the bearing, a low magnetic reluctance shunt is provided. For the bearing 18 in the embodiment of the invention illustrated in FIG. 1, this comprises labyrinth seal elements 28 and 32 composed of high-permeability magnetic material having a permeability as high as, or at least preferably higher than, that of the end bell 4 which may be a casting or forging. It is, therefore, appreciated that labyrinth seal element 28 not only serves as a low magnetic reluctance shunt but an integral section thereof also serves as a bearing grease cap or retainer.

The confronting surfaces of the inter-leaved projecting portions of the labyrinth seal elements 28 and 32 are relatively closely spaced so as to leave very small air gaps such as an air gap 118 between them. This minimizes the reluctance of the magnetic path through the shunt or by-pass formed by the labyrinth seal elements. Moreover, since there is a plurality of annular projections within a plurality of confronting surface portions, there is a plurality of parallel air gaps, in effect a short air gap of very wide cross section. Thus the preferred magnetic leakage flux path extends radially inward through the end bell 4 to the end bell sleeve 16, axially inward through labyrinth seal element 28, labyrinth seal element 32, a portion of shaft 20, and thence to the polar member 24 as illustrated by arrow 112. In this manner magnetic flux leakage is by-passed around ball bearing 18.

It should be recognized with respect to FIG. 1 that a nonmagnetic sleeve could readily encompass the outer race of pilot bearing 78 between the bored portion of polar member 24. However, at this particular point in the eddy current coupling illustrated, flux leakage across the bearing is of a minor nature, the majority of flux leakage passing directly from polar member 24 to sleeve 82 of conical hub 80 as illustrated by arrows 114.

Although in FIG. 1 the invention has been illustrated and applied to a liquid-cooled, single support stationary field, horizontal shaft type of construction, it will be understood that the invention is not limited thereto. For example, as illustrated in FIG. 3, the principle of the invention may be employed with a single supported drum, stationary field, vertical shaft, air cooled apparatus having a pair of relatively close spaced bearings subjected to flux leakage.

In the embodiment of FIG. 3 is shown a single support eddy current coupling, vertically mounted. Similar to FIG. 1, the coupling is integrally mounted to a motor M which drives an input shaft 84 and a conical hub 80 with a driven member or drum 72 attached thereto. Unlike the previously described structure, however, the coupling is air-cooled and an annular stationary field supporting member 119 is carried by a pair of roller bearings 120 and 122 of the spherical type. A generally C-shaped magnetizing polar member 24 includes a plurality of interdigitated polar teeth 62 and 64 and this member is keyed to output shaft 20. An air gap 74 is located between the drum 72 and the faces of said pole teeth.

The drum 72 is air cooled by means of vanes 124 circumferentially spaced and axially located on the outer periphery of said drum. Cool air is drawn through inlet 126, chamber 128, passageways formed by vanes 124, and is then discharged through aperture 130 and exits via screen 132 by means of chamber 134. Cool air is also drawn through air gap 74 and discharged in a similar manner through drum aperture 136.

The output shaft 20 is supported by a pair of bearing units 120 and 122 shown as roller bearings, each having an outer bearing race 138 and an inner bearing race 140. The inner bearing race 140 embraces shaft 20 and nonmagnetic rings 142 are interposed between the outer bearing races 138 and the inner surface of a bored section in the support member 119. A magnetic shunt in the form of a bearing sleeve 144 is also provided which surrounds the shaft 20 between bearings 120 and 122, and in this manner, the flux leakage of field winding 12 is diverted from the roller bearings and follows the course of the arrows 145 through the support member 119 and the shaft 20.

Disposed from bearing 122 and suitably attached to support member 119 is an annular bearing cap or retainer 146 which defines a grease chamber 148 between bearing 122, grease being admitted through an inlet passage 150 and discharged through a grease outlet 152. The section of bearing sleeve 144 confronting bearing 122 serves as a grease seal or retainer and has a U-shaped cross section which defines a grease chamber 154. Likewise the other end of bearing sleeve 144 serves as a bearing cap or retainer and has an L-shaped cross section which defines a grease chamber 156 between bearing 120, grease being admitted through passage 158 and discharged through passage 160.

The main flux path is illustrated by arrows 162 shown in a generally O-shaped arrangement circumferentiating field coil 12. It becomes apparent, therefore, that without magnetic shunt 144 and the nonmagnetic rings 142, magnetic flux leakage would pass through bearings 118 and 120 as illustrated by dashed arrows 164 and 166.

As hereinbefore described, bearing sleeve 144 not only serves as a low magnetic reluctance shunt but integral sections thereof also serves respectively as a grease seal and bearing cap or retainer.

FIG. 4 is a modification of FIG. 3 and is also directed to a vertical shaft construction of an eddy current coupling. The support member 119 is carried by a pair of ball bearings 168 and 170 separated by a bearing spacer 172, the latter being separated from support member 119 by a relatively large air gap 174. An annular bearing cap or retainer 176 disposed from bearing 152 is suitably attached to support member 119 and defines a grease chamber 178 between bearing 168. Suitable lubrication is admitted through an inlet passage 180 to bearing 168 via grease chamber 178.

In some cases it is unnecessary to interpose a nonmagnetic liner to circumferentiate the bearing to avoid flow of flux leakage through the ball or roller bearings. This is illustrated in the arrangement of FIG. 4 which includes an annular bearing shunt 182 made of magnetic material located between bearing 168 and bearing spacer 172. Bearing shunt 182 serves as a bearing grease seal or retainer and has a U-shaped cross section which defines a grease chamber 184. This structure illustrates a condition having minimized flux leakage which requires only a relatively small magnetic shunt to compensate for flux leakage as illustrated by arrows 186.

If desired, a second magnetic bearing shunt 188 may be positioned adjacent bearing 170 to compensate for any flux leakage predominant in the area illustrated by dashed arrows 190. Bearing shunt 188 also serves as a bearing grease seal or retainer and defines a grease chamber 192 with its U-shaped cross section. Air gap 174 also serves as a grease chamber having a grease inlet passage 194 and an outlet passage 196. In the description directed to FIG. 4, only annular bearing shunts are utilized in close proximity to the respective bearings and this is sufficient to provide the requisite elimination of magnetic heating loss and heat distortion effects in the bearings. In this instance, bearing shunts 182 and 188 not only serve as low magnetic reluctance shunts but also as bearing grease retainers or seals.

In each of the environments illustrated, at least a section of a grease retainer confronts a bearing subject to flux leakage in an electromagnetic device. The retainer is made of magnetic material and serves as a low reluctance shunt or by-pass which diverts flux leakage from the bearing. In addition, a nonmagnetic ring or shield surrounds at least one race of the bearings described and the inclusion of said shield further aids in preventing flux penetration of the bearings by providing a high reluctance magnetic path when required.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended, therefore, to cover all such modifications as fall within the scope of the invention.

What I claim is:

1. An electrodynamic device comprising in combination a stator, a rotor, an electrical exciting winding carried by one of the foregoing members, a shaft composed of ferromagnetic material, said shaft carrying said rotor and said winding encircling the shaft with a magnetic axis parallel to the shaft whereby lines of magnetic flux are generated having a portion of their path through or parallel to the shaft, end bell means composed of ferromagnetic material secured to the stator and carrying bearing supports, bearing means of the rolling element type interposed between the shaft and the bearing support for rotatably supporting the shaft, the stator and rotor being so formed as to have surfaces spaced from each other leaving an air gap resulting in tendency for leakage flux to pass through the end bell means and the shaft, a nonmagnetic metallic liner interposed between the bearing means and one of the pair of elements consisting of the bearing support and the shaft, and a pair of relatively rotatable magnetizable members with a plurality of interleaved surfaces in close proximity to each other to provide a short air gap of large cross section, one member contacting the end bell means, the other contacting the shaft for providing a shunt path for magnetic flux around said bearing means.

2. In an anti-friction bearing having rolling elements subject to a magnetic field, a bearing housing having a bearing outer race mounted therein, a non-magnetic metallic liner interposed between said housing and said outer race, a bearing inner race within said outer race for supporting said rolling elements between said races, a pair of relatively rotatable magnetizable members, each with a plurality of annular fingers extending axially, the fingers being interleaved with close tolerances with surfaces in close proximity to each other to provide a short air gap of large cross-section, one member contacting the bearing housing and both members providing a low reluctance magnetic path for magnetic flux around said bearing.

3. An anti-friction bearing assembly comprising bearing housing, a journal, both composed of magnetic material, a bearing having rolling elements subject to a magnetic field with an outer race supported by the bearing housing and an inner race embracing the journal, and a pair of relatively movable magnetizable members, each with a plurality of annular fingers extending axially, the fingers being interleaved with close tolerances with surfaces in close proximity to each other to provide a short air gap of large cross-section, one member contacting the bearing outer housing, the other contacting the journal for forming a shunt path for magnetic flux around said bearing.

References Cited by the Examiner
UNITED STATES PATENTS 2,503,017  4/50  Wisman _____ 310—190

FOREIGN PATENTS 165,464  8/53  Australia.
317,649  1/57  Switzerland.

OTHER REFERENCES

Allis-Chalmers Electrical Review, Is Your Bearing Trouble a Puzzler?, 4th Quarter, 1951, pages 28 and 29.

MILTON O. HIRSHFIELD, *Primary Examiner.*